United States Patent
Choi

(10) Patent No.: US 10,250,031 B2
(45) Date of Patent: Apr. 2, 2019

(54) MAGNETIC COIL DRIVING CIRCUIT FOR MAGNETIC CONTACTOR

(71) Applicant: LSIS CO., LTD., Anyang-si, Gyeonggi-do (KR)

(72) Inventor: Jaehyuk Choi, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 302 days.

(21) Appl. No.: 15/412,002

(22) Filed: Jan. 21, 2017

(65) Prior Publication Data

US 2017/0222428 A1 Aug. 3, 2017

(30) Foreign Application Priority Data

Feb. 2, 2016 (KR) .......................... 10-2016-0013082

(51) Int. Cl.
| | |
|---|---|
| *H02H 7/22* | (2006.01) |
| *H01H 47/32* | (2006.01) |
| *H01F 7/18* | (2006.01) |
| *H01H 47/00* | (2006.01) |

(Continued)

(52) U.S. Cl.
CPC ........... *H02H 7/222* (2013.01); *H01F 7/1844* (2013.01); *H01H 47/002* (2013.01); *H01H 47/325* (2013.01); *F02D 41/20* (2013.01); *H01H 2047/025* (2013.01)

(58) Field of Classification Search
USPC ................................ 361/93.7–93.9, 103, 106
See application file for complete search history.

(56) References Cited

U.S. PATENT DOCUMENTS

| | | | |
|---|---|---|---|
| 2008/0170348 A1* | 7/2008 | Guo ....................... | H01H 47/04 361/186 |
| 2008/0218928 A1 | 9/2008 | Baek | |
| 2013/0009464 A1* | 1/2013 | Firehammer ....... | H01M 10/425 307/9.1 |

FOREIGN PATENT DOCUMENTS

| | | |
|---|---|---|
| CN | 101261908 A | 9/2008 |
| CN | 103943410 A | 7/2014 |
| DE | 29909901 | 11/1999 |

(Continued)

OTHER PUBLICATIONS

Chinese Office Action for related Chinese Application No. 201710060324.8; action dated May 21, 2018; (7 pages).

(Continued)

*Primary Examiner* — Danny Nguyen
(74) *Attorney, Agent, or Firm* — K&L Gates LLP

(57) ABSTRACT

The magnetic coil driving circuit of the magnetic contactor according to the present invention comprises a semiconductor switch configured to open or close a circuit for magnetizing or demagnetizing a magnetic coil; a pulse width modulation unit configured to output a pulse signal as a control signal for turning on or off the semiconductor switch; a control unit configured to output a control signal for changing a pulse width of the pulse signal to the pulse width modulation unit; and a temperature detection and protection unit configured to detect a temperature inside the magnetic contactor, output an output signal for turning off the semiconductor switch when the temperature exceeds an allowable temperature, and control the semiconductor switch by the pulse signal from the pulse width modulation unit when the temperature is within the allowable temperature.

10 Claims, 5 Drawing Sheets

(51) Int. Cl.
*F02D 41/20* (2006.01)
*H01H 47/02* (2006.01)

(56) References Cited

FOREIGN PATENT DOCUMENTS

| EP | 0528357 | 2/1993 |
|----|---------|--------|
| EP | 2407994 | 1/2012 |
| JP | 2003092825 | 3/2003 |
| JP | 2007323991 | 12/2007 |
| JP | 2008010167 | 1/2008 |
| JP | 2009296826 | 12/2009 |
| JP | 2010050531 | 3/2010 |
| JP | 2010259254 | 11/2010 |

OTHER PUBLICATIONS

European Patent Office Application Serial No. 16202947.4, Search Report dated Jun. 8, 2017, 9 pages.
Korean Intellectual Property Office Application No. 10-2016-0013082, Search report dated Apr. 22, 2016, 4 pages.

\* cited by examiner

MAGNETIC COIL DRIVING CIRCUIT FOR MAGNETIC CONTACTOR

CROSS-REFERENCE TO RELATED APPLICATION

Pursuant to 35 U.S.C. § 119(a), this application claims the benefit of earlier filing date and right of priority to Korean Application No. 10-2016-0013082, filed on Feb. 2, 2016, the contents of which are all hereby incorporated by reference herein in its entirety.

BACKGROUND OF THE INVENTION

1. Field of the Invention

The present disclosure relates to a magnetic contactor, and more particularly, to a driving circuit for magnetizing a magnetic coil of a magnetic contactor. The magnetic coil driving circuit of the magnetic contactor according to the present disclosure can detect an increase in temperature inside the magnetic contactor and prevent damage to, and rapid lifespan reduction of, the magnetic contactor and an electric load connected thereto.

2. Background of the Invention

A magnetic contactor is connected to an electric circuit (hereinafter referred to as a circuit) between an electric power source and an electric load such as a motor supplied with electric power from the electric power source and is configured to open or close the electric circuit depending on whether a switching control signal is applied. Accordingly, the magnetic contactor is used as a control means for running or stopping the load such as a motor by connecting or breaking an electric power circuit to the load.

A magnetic contactor is configured to magnetize or demagnetize a stationary core disposed around the magnetic coil according to magnetization or demagnetization of the magnetic coil to attract or repel a movable core movably installed at a location facing the stationary core by magnetic force, thus bringing a movable contact connected to the movable core in contact to a corresponding stationary contact to operate as circuit closing or separating the movable contact from the corresponding stationary contact to operate as circuit opening.

In such a magnetic contactor, a magnetic coil driving circuit is a driving circuit for magnetizing or demagnetizing the magnetic coil and is configured to include various kinds of analog components.

That is, the magnetic coil driving circuit includes various electrical components such as a magnetic coil, a capacitor, a semiconductor switch, etc.

However, the components consume electric power while operating, and consumed electric power generates heat a limited space inside the magnetic contactor, which causes a problem of deterioration of a corresponding component and a problem of damage to a corresponding component and its ambient components.

In particular, the driving circuit for driving the magnetic coil for the magnetic contactor may accurately perform its functions only when electrical sub-components maintain their own electric characteristics.

However, when temperature inside an electric power distribution board in which the magnetic contactor is installed increases or when temperature inside the magnetic contactor continuously increases since an overvoltage is continuously applied to an electric power source input terminal of the magnetic contactor, a conventional magnetic contactor does not have any protection circuit, thus resulting in a lifespan reduction or a burn-out of the magnetic contactor and also a risk for damage to the load (e.g., a motor) connected to the magnetic contactor.

SUMMARY OF THE INVENTION

Therefore, an aspect of this disclosure is to provide a magnetic coil driving circuit for magnetic contactor that can protect the magnetic coil in order to prevent burn-out or rapid lifespan reduction of the magnetic coil due to an increase in temperature inside the magnetic contactor or continuous application of an overvoltage from an input electric power source.

To achieve these and other advantages and in accordance with the purpose of this disclosure, as embodied and broadly described herein, there is provided a magnetic coil driving circuit for magnetic contactor, the magnetic coil driving circuit comprising:

a semiconductor switch connected in series to a magnetic coil and configured to magnetize the magnetic coil upon turning on and demagnetize the magnetic coil upon turning off;

a pulse width modulation unit connected to the semiconductor switch and configured to output a pulse signal to the semiconductor switch as a control signal for turning on or off the semiconductor switch;

a control unit connected to the pulse width modulation unit and configured to output a control signal for changing a pulse width of the pulse signal in order to perform control to increase the amount of electric current flowing through the magnetic coil when the magnetic coil is initially magnetized and perform control to decrease the amount of electric current flowing through the magnetic coil when the magnetization of the magnetic coil is maintained; and a temperature detection and protection unit connected to the semiconductor switch and configured to detect a temperature inside the magnetic contactor, output an output signal for turning off the semiconductor switch in a high-temperature state when the temperature exceeds an allowable temperature, and to make the semiconductor switch be controlled by the pulse signal from the pulse width modulation unit in a normal state when the temperature is within the allowable temperature.

According to another aspect of the disclosure, the magnetic coil driving circuit further comprises a voltage detection unit configured to detect a voltage of an AC power source supplied to the magnetic contactor, wherein the control unit is configured to compare the voltage of the AC power source detected by the voltage detection unit with a reference voltage and output a control signal for opening the magnetic contactor to the pulse width modulation unit when the voltage of the AC power source exceeds the reference voltage.

wherein the temperature detection and protection unit comprises at least one thermal variable resistor having a resistance value that varies with a change in temperature.

According to still another aspect of the disclosure, the temperature detection and protection unit comprises: at least one thermal variable resistor having a resistance value that varies with a change in temperature; and at least one variable resistor connected in parallel with the thermal variable resistor.

According to still another aspect of the disclosure, the temperature detection and protection unit comprises: a temperature detection unit configured to output a first voltage that varies with a change in temperature inside the magnetic contactor; and a comparator configured to compare the first voltage, which is output from the temperature detection unit, and a second voltage, which is a predetermined reference voltage.

According to still another aspect of the disclosure, the temperature detection and protection unit comprises: a temperature detection unit configured to output a first voltage that varies with a change in temperature inside the magnetic contactor; a first comparator configured to compare the first voltage, which is output from the temperature detection unit, and a second voltage, which is a predetermined reference voltage; and a second comparator having a first input terminal connected to an output terminal of the first comparator and a second input terminal connected to an output terminal of the pulse width modulation unit, the second comparator being configured to compare an input signal from the first input terminal and an input signal from the second input terminal and output a switching control signal for controlling a switching of the semiconductor switch.

According to still another aspect of the disclosure, when the temperature inside the magnetic contactor exceeds the allowable temperature and a temperature state is in a high-temperature state, the comparator is configured to output a digital signal having a logical value 0.

According to still another aspect of the disclosure, the second comparator is configured with an AND gate; and when the temperature inside the magnetic contactor exceeds the allowable temperature and a temperature state is in a high-temperature state, the first comparator is configured to output a digital signal having a logical value 0.

According to still another aspect of the disclosure, the second comparator is configured with an AND gate; when the temperature inside the magnetic contactor is within the allowable temperature and a temperature state is in a normal state, the first comparator is configured to output a digital signal having a logical value 1; and the semiconductor switch is turned on or off depending on the pulse signal from the pulse width modulation unit.

According to still another aspect of the disclosure, the second comparator is configured with an AND gate; when the temperature inside the magnetic contactor exceeds the allowable temperature and a temperature state is in a high-temperature state, the first comparator is configured to output a digital signal having a logical value 0; and the semiconductor switch is turned off independently of the pulse signal from the pulse width modulation unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings.

DETAILED DESCRIPTION OF THE INVENTION

Figure 1:
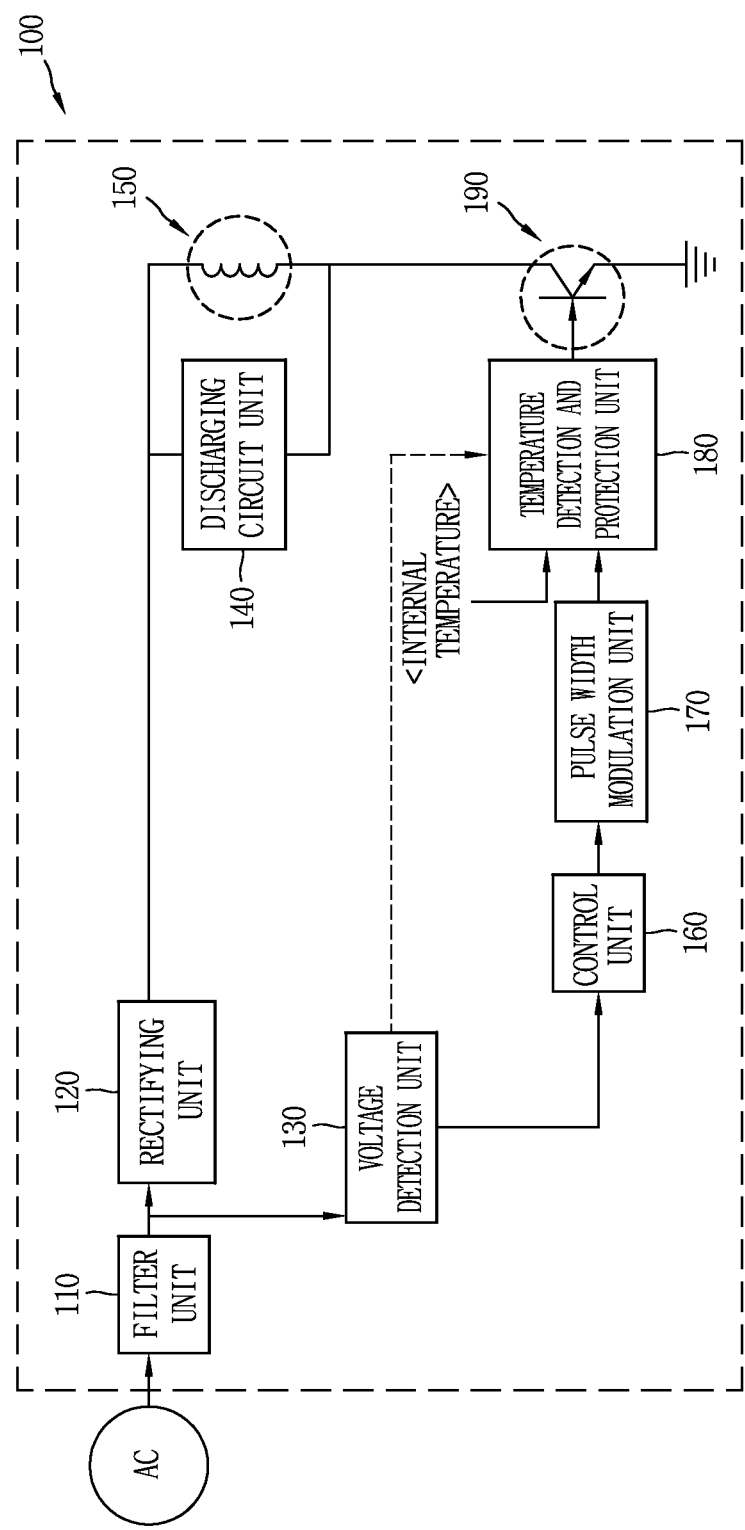
FIG. 1 is a block diagram schematically showing a magnetic coil driving circuit for a magnetic contactor according to an embodiment of the present invention.

Hereinafter, exemplary embodiments disclosed in the disclosure will be described in detail with reference to the accompanying drawings, and the same or similar elements are designated with the same numeral references regardless of the numerals in the drawings and redundant descriptions thereof will be omitted.

Exemplary embodiments of the present invention will be described below in detail with reference to the accompanying drawings.

FIG. 1 is a block diagram of a coil driving circuit of a magnetic contactor according to an embodiment of the present invention.

Referring to FIG. 1, a magnetic coil driving circuit 100 comprises a filter unit 110, a rectifying unit 120, a voltage detection unit 130, a discharging circuit unit 140, a magnetic coil 150, a control unit 160, a pulse width modulation unit 170, a temperature detection and protection unit 180, and a semiconductor switch 190.

The filter unit 110 is a circuit for removing noise signals that may be incorporated into an AC electric power source. For example, the filter unit 110 may be configured with a low-pass filter circuit for removing high-frequency noise signals.

The rectifying unit 120 rectifies electric power output from the filter unit 110 and outputs DC electric power. The rectifying unit 120 may be configured with a typical diode bridge circuit.

The voltage detection unit 130 detects a voltage level of an input electric power source that has passed through the filter unit 110. That is, the voltage detection unit 130 detects and outputs voltages on a circuit to which the magnetic contactor is connected, in other words, voltages for three phases (R phase-S phase-T phase). For example, the voltage detection unit 130 may be configured with a potential transformer (hereinafter simply referred to as a PT).

The discharging circuit unit 140 is connected in parallel to both ends of the magnetic coil 150. The discharging circuit unit 140 is a circuit unit configured to discharge electric energy charged in the magnetic coil 150 when the semiconductor switch 190 is switched from a turned-on state to a turned-off state.

The discharging circuit unit 140 may be configured with a transistor switch or a flywheel diode.

The magnetic coil 150 can be magnetized or demagnetized depending on whether an electric current is applied thereto or not to provide or stop providing magnetic force for bringing a movable contact (not shown) of the magnetic contactor in contact with a corresponding stationary contact (not shown) or separating the movable contact from the stationary contact.

For example, when the magnetic coil 150 is magnetized by an electric current flowing through the magnetic coil 150, magnetic attracting force is generated to move the movable contact, which is combined to a movable core (not shown), toward the stationary contact. The movable contact is in contact with the stationary contact. Accordingly, the magnetic contactor is turned to a circuit-closing state. When the magnetic coil 150 is demagnetized by stopping applying an electric current to magnetic coil 150, the magnetic attracting force is not generated. Thus, the movable contact moves to a position at which the movable contact is separated from the stationary contact by elastic force exerted by a return spring. Accordingly, the magnetic contactor is turned to a circuit-opening state.

The control unit 160 is located between an output terminal of the voltage detection unit 130 and an input terminal of the pulse width modulation unit 170.

The control unit 160 compares an AC input voltage of an AC electric power source detected by the voltage detection unit 130 with a predetermined reference voltage in consideration of an allowable range from a rated voltage, and transmits a control signal for opening the magnetic contactor to the pulse width modulation unit 170 when an AC input voltage that exceeds the reference voltage is detected.

Also, in order to perform control to increase the amount of electric current flowing through the magnetic coil 150 when the magnetic coil 150 is initially driven and to decrease the amount of electric current flowing through the magnetic coil 150 when the magnetic coil 150 is kept magnetized, the control unit 160 outputs, to the pulse width modulation unit 170, a control signal for changing a pulse width of a pulse signal (pulse control signal) for turning on or off the semiconductor switch 190.

Also, the control unit 160 performs control in consideration that magnetic force of the magnetic coil 150 needed to move the movable contact (not shown) to a position at which the movable contact initially comes in contact with the stationary contact (not shown) is different from the magnitude of electric current flowing through the magnetic coil 150 needed to keep the movable contact in contact with the stationary contact (that is, the magnitude of electric current needed for the maintenance is smaller than the magnitude of electric current needed upon movement to an initial contact position). That is, the control unit 160 may output, to the pulse width modulation unit 170, a control signal for shortening a pulse width at which the semiconductor switch 190 is turned on and lengthening a pulse width at which the semiconductor switch 190 is turned off while the magnetic contactor maintains a contact state (namely, a circuit-closing state or a turned-on state) (i.e., while the magnetic coil 150 is kept magnetized) and may output a control signal for lengthening the pulse width at which the semiconductor switch 190 is turned on to the pulse width modulation unit 170 upon movement to the initial contact (that is, the magnetic coil 150 is magnetized for the first time).

Accordingly, the control unit 160 outputs, to the pulse width modulation unit 170, a control signal for controlling a switching operation of the semiconductor switch 190 such that a required magnitude of electric current flows through the magnetic coil 150.

The pulse width modulation unit 170 outputs, to the semiconductor switch 190, a switching control signal configured with a high-level or low-level pulse signal corresponding to a control signal transmitted by the control unit 160.

The temperature detection and protection unit 180 according to the present invention processes the switching control signal received from the pulse width modulation unit 170 according to a temperature inside the magnetic contactor and outputs the processed switching control signal to the semiconductor switch 190.

In more detail, the temperature detection and protection unit 180 detects the temperature inside the magnetic contactor and generates a temperature detection signal according to the detected temperature. On the basis of a combination of the switching control signal received from the pulse width modulation unit 170 and the temperature detection signal, the temperature detection and protection unit 180 finally generates and outputs a final switching control signal for controlling a switching of the semiconductor switch 190.

For example, when the detected temperature inside the magnetic contactor exceeds a predetermined allowable range due to an increase in ambient temperature of the magnetic contactor or an excessive increase in an input voltage of an AC power source input to the magnetic contactor, the semiconductor switch 190 may be turned off to demagnetize the magnetic coil 150, thus protecting the magnetic contactor from a rapid lifespan reduction or a burn-out.

On the other hand, when the detected temperature is within the predetermined allowable range, the switching control signal generated by the pulse width modulation unit 170 simply passes through the temperature detection and protection unit 180, that is, becomes the final switching control signal to control an operation of turning on or off the semiconductor switch 190. That is, when the detected temperature is within the predetermined allowable range, the switching control signal is not changed by the temperature detection and protection unit 180, and the switching control signal from the pulse width modulation unit 170 is output to the semiconductor switch 190 as the final switching control signal.

The semiconductor switch 190 is turned on or off according to the final switching control signal of the temperature detection and protection unit 180 to allow an electric current to flow through the magnetic coil 150 or break the flow of the electric current. That is, the semiconductor switch 190 performs a switching according to an output signal of the temperature detection and protection unit 180 to perform control to magnetize or demagnetize the magnetic coil 150.

The semiconductor switch 190 may be configured to as a semiconductor switch the switching of which can be controlled, such as a transistor, an insulated-gate bipolar transistor (IGBT), a thyristor, etc.

Here, in order to operate the semiconductor switch 190, the magnetic coil driving circuit of the magnetic contactor according to the present invention may include more circuit components than as shown in FIG. 1.

For example, the discharging circuit unit 140 shown in FIG. 1 may additionally include a resistor, a semiconductor switch, a capacitor, and a plurality of diodes in order to effectively discharge electric energy charged in the magnetic coil when the semiconductor switch 190 is switched from a turned-on state to a turned-off state.

As another example, a constant voltage circuit section (not shown) for supplying a constant reference voltage (e.g., DC 16V) to the control unit 160 even when an input voltage from the AC power source changes may be further included.

Figure 2:
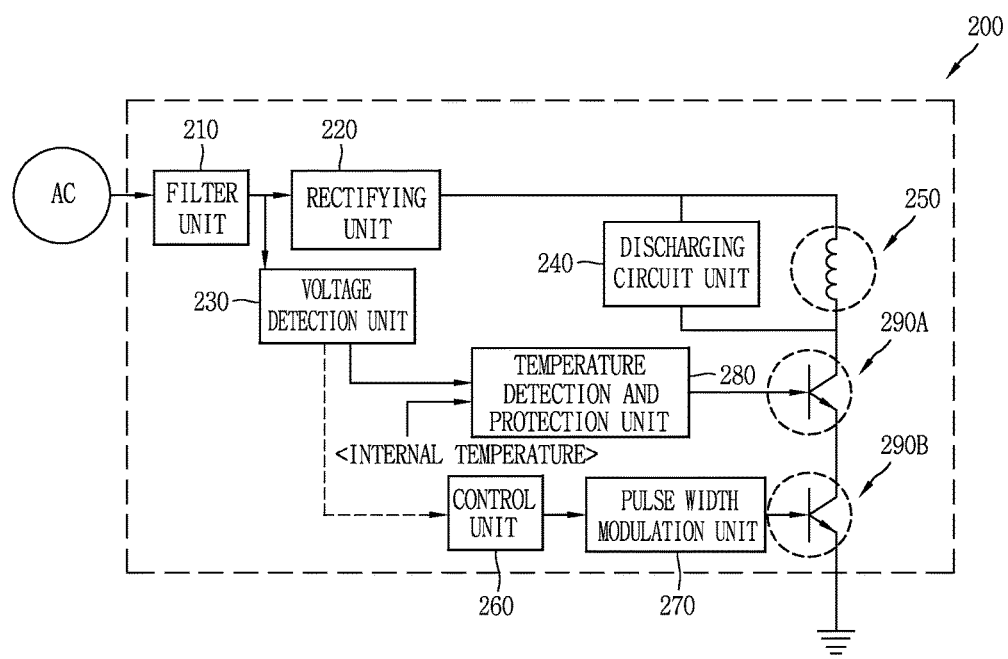
FIG. 2 is a block diagram showing a configuration of a magnetic coil driving circuit for a magnetic contactor according to another embodiment of the present invention.

FIG. 2 is a circuit diagram of a magnetic coil driving circuit including a temperature detection and protection unit according to another embodiment of the present invention.

A coil driving circuit 200 of a magnetic contactor according to another embodiment of the present invention may include a filter unit 210, a rectifying unit 220, a voltage detection unit 230, a discharging circuit unit 240, a magnetic coil 250, a control unit 260, a pulse width modulation unit 270, and a temperature detection and protection unit 280, which have the same or different electrical functions as or from the corresponding elements of FIG. 1.

In order to avoid redundant descriptions, only elements different from those of the embodiment shown in FIG. 1 will be described.

The temperature detection and protection unit 280 receives an input voltage detection signal of an AC power source output by the voltage detection unit 230. Also, the temperature detection and protection unit 280 detects a temperature inside the magnetic contactor. The temperature detection and protection unit 280 generates a temperature detection signal corresponding to the detected temperature inside the magnetic contactor and outputs a switching control signal for a first semiconductor switch 290A on the basis of a combination of the generated temperature detection signal and the received input voltage detection signal.

In detail, how the temperature detection and protection unit 280 measures the temperature, converts the measured temperature into a corresponding electric signal, and then generates an output signal corresponding to the electric signal will be described later with reference to FIG. 3.

Referring to FIG. 2 again, the control unit 260 may receive an input signal from the voltage detection unit 230, output a control signal corresponding to the received input signal, and transmit the control signal to the pulse width modulation unit 270.

The pulse width modulation unit 270 outputs a pulse signal as a high-level or low-level switching control signal having a pulse width corresponding to the control signal transmitted by the control unit 260 to control switching (opening or closing) of a second semiconductor switch 290B.

Here, the first semiconductor switch 290A, the second semiconductor switch 290B, and the magnetic coil 150 are connected in series with one another. When at least one of the first semiconductor switch 290A and the second semiconductor switch 290B is turned to an open state, DC power from the rectifying unit 220 stops being supplied to the magnetic coil 250.

Arrangement of the temperature detection and protection unit 280, the first semiconductor switch 290A, the control unit 260, the pulse width modulation unit 270, and the second semiconductor switch 290B shows configuration characteristics in which a control of the DC power supplying to the magnetic coil 250 by the control unit 260, the pulse width modulation unit 270, and the second semiconductor 290B and a control of DC power supplying to the magnetic coil 250 by the temperature detection and protection unit 280 and the first semiconductor switch 290A can be executed independently with each other.

According to this configuration characteristics, when the temperature inside the magnetic contactor is within a predetermined allowable temperature, the first semiconductor switch 290A connected to the temperature detection and protection unit 280 is kept turned on, and the pulse width modulation unit 270 outputs a pulse signal having a corresponding pulse width according to a control signal output by the second semiconductor switch 290B to initially turn on the second semiconductor switch 290B and then alternately perform control to turn on or off the second semiconductor switch 290B, thus providing an electric power supplied from an electric power source to a loading device through the magnetic contactor.

When the temperature inside the magnetic contactor exceeds the predetermined allowable temperature, the temperature detection and protection unit 280 performs control to turn off the first semiconductor switch 290A to demagnetize the magnetic coil 250. Thus, the magnetic contactor is turned to an open state (turned off). Accordingly, independently of a switching operation of the second semiconductor switch 290B, the electric power supplied from the power source to the load through the magnetic contactor is broken (interrupted).

How the temperature detection and protection unit 280 measures a temperature, converts the measured temperature into a corresponding electrical signal, and then generate an output signal corresponding to the electrical signal will be described with reference to FIG. 3, which is a circuit block diagram showing a detailed configuration of a temperature detection and protection unit 300 according to the present invention.

Figure 3:
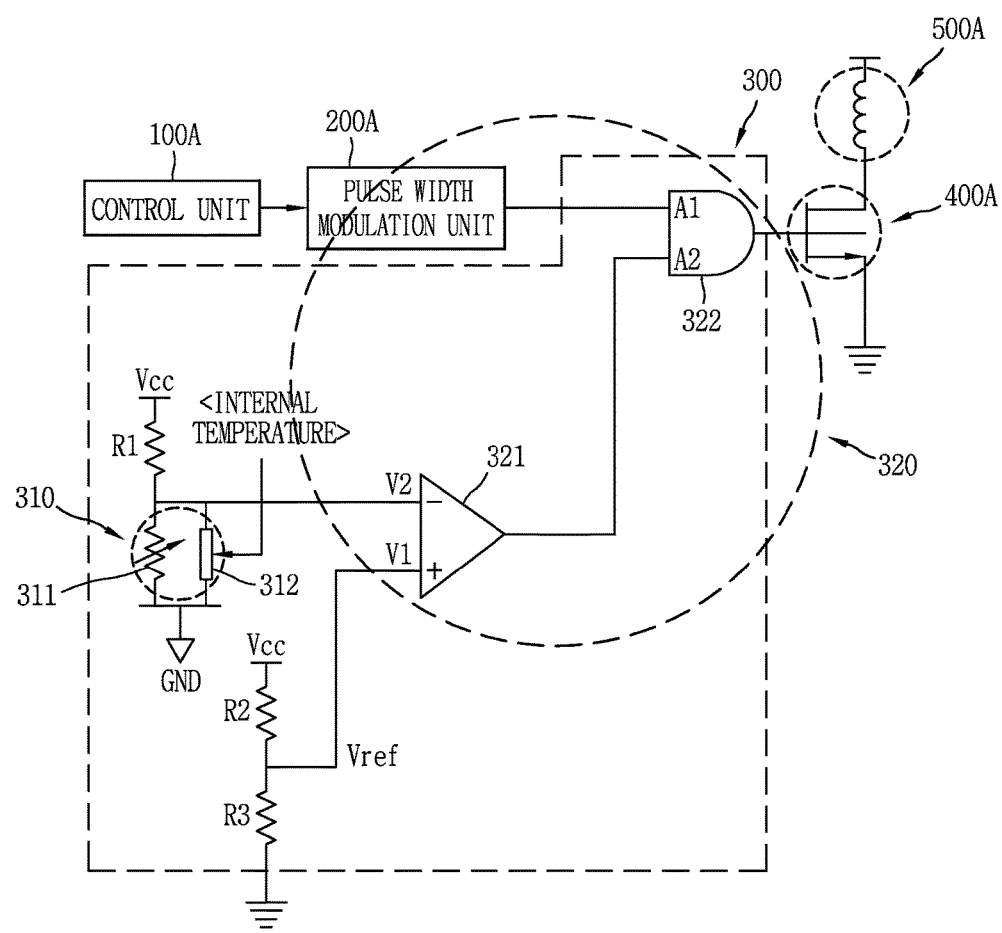
FIG. 3 is a block diagram showing in more detail a configuration of a temperature detection and protection circuit unit of a magnetic coil driving circuit according to an embodiment of the present invention.

In FIG. 3, a control unit 100A, a pulse width modulation unit 200A, a semiconductor switch 400A, and a magnetic coil 500A have the same functions as the control unit 160, the pulse width modulation unit 170, and the semiconductor switch 190, which are corresponding elements described in FIG. 1. Thus, descriptions thereof will be omitted in order to avoid repetition.

Referring to FIG. 3, the temperature detection and protection unit 300 includes a temperature detection unit 310 configured to detect a temperature inside the magnetic contactor and output a voltage signal as a temperature detection signal indicating the detected temperature and a comparison unit 320 configured to receive the voltage signal (the temperature detection signal) output by the temperature detection unit 310 and control an operation of turning on or off the semiconductor switch 400A to be turned on or off.

Here, the temperature detection unit 310 includes at least one variable resistor 311 and at least one thermal variable resistor 312, which are connected in parallel with each other.

The thermal variable resistor 312 is a kind of resistor. It is preferable that the thermal variable resistor 312 have a characteristic in which a resistance value changes linearly with a sensed change in temperature. The thermal variable resistor 312 may be replaced with a thermal variable resistor having another electrical characteristic that is desired by a user.

The variable resistor 311 can be adjusted and set to have a resistance value desired by the user. Also, according to a combination of the resistance value that varies depending on a change in temperature of the thermal variable resistor 312 and the resistance value of the variable resistor 311, the resistance value of the variable resistor 311 may be adjusted and set by the user in consideration of how sensitively the temperature detection unit 310 outputs a corresponding magnitude of voltage signal (the temperature detection signal).

For example, when a user sets resistance of the variable resistor 311 to be relatively larger than resistance of the thermal variable resistor 312 that changes with a change in temperature inside the magnetic contactor, a change in output voltage of the temperature detection unit 310 by the thermal variable resistor 312 may be insignificant.

The comparison unit 320 includes a plurality of comparators 321 and 322. Among the plurality of comparators, a negative (−) input terminal of the first comparator 321 may receive a first voltage signal having an output voltage according to a combined resistance of the thermal variable resistor 312 and the variable resistor 311, and a positive (+) input terminal of the first comparator 321 may receive a second voltage signal, which is a reference voltage signal Vref.

For a circuit in which a DC constant voltage Vcc and resistors R2 and R3 are connected in series to one another, the positive (+) input terminal of the first comparator 321 is connected to a middle point between the resistors R2 and R3. Accordingly, the reference voltage Vref is obtained by dividing the DC constant voltage Vcc by the resistors R2 and R3 having predetermined fixed resistance values, and the obtained reference voltage is provided to the positive (+) input terminal of the first comparator.

The first comparator 321 may compare a voltage value corresponding to the first voltage signal and a voltage value corresponding to the second voltage signal to output a high-level or low-level output signal, that is, a digital signal having a logical value 1 or 0.

Here, when the voltage value corresponding to the first voltage signal, that is, a voltage value corresponding to the temperature detection signal is higher than the voltage value corresponding to the second voltage signal, that is, the reference voltage value, the first comparator 321 may output a low-level output signal, that is, an output signal having a logical value 0.

The second comparator 322 receives, as two input signal, the output signal that is output from the first comparator 321 and a switching control signal that is a pulse signal output by the pulse width modulation unit 200A, compares the two input signals, and outputs a digital control signal to the semiconductor switch 400A as a final switching control signal as a result of the comparison.

The second comparator 322 receives the output signal of the first comparator 321 at a first input terminal A2 and the switching control signal output from the pulse width modulation unit 200A at a second input terminal A1, compares the output signal of the first comparator 321 and the switching control signal, and outputs the final switching control signal for performing a switching control of the semiconductor switch 400A according to a predetermined logic.

According to an embodiment of the present invention, the second comparator 322 may be configured with an AND gate. Accordingly, the second comparator 322 performs a logical product of the two input signals, that is, the output signal corresponding to the temperature detection signal (digital signal) and the switching control signal and outputs the output signal to the semiconductor switch 400A. Here, the second comparator is simply not limited to an AND gate.

That is, various logic gates may be used, which can receive a temperature detection signal obtained by detecting a change in temperature inside a magnetic contactor due to heat that is generated while internal components constituting the magnetic contactor and electrical devices (a plurality of circuit breakers, a digital protection relay, etc.) adjacent to the magnetic contactor in a power distribution board and then reflect the received temperature detection signal in a switching operation of the magnetic contactor. However, the logic gates may be selected in consideration of space occupied in the above-described driving device and complexity and production costs of its associated circuits.

Figure 4A:
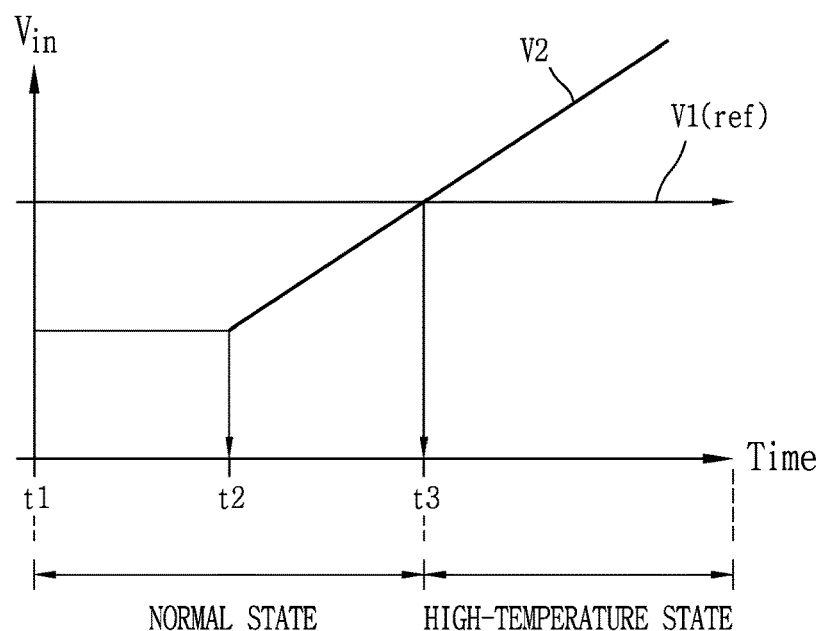
FIGS. 4A and 4B are waveform diagrams for helping understand an operation of the temperature detection and protection circuit unit of FIG. 3.
Figure 4B:
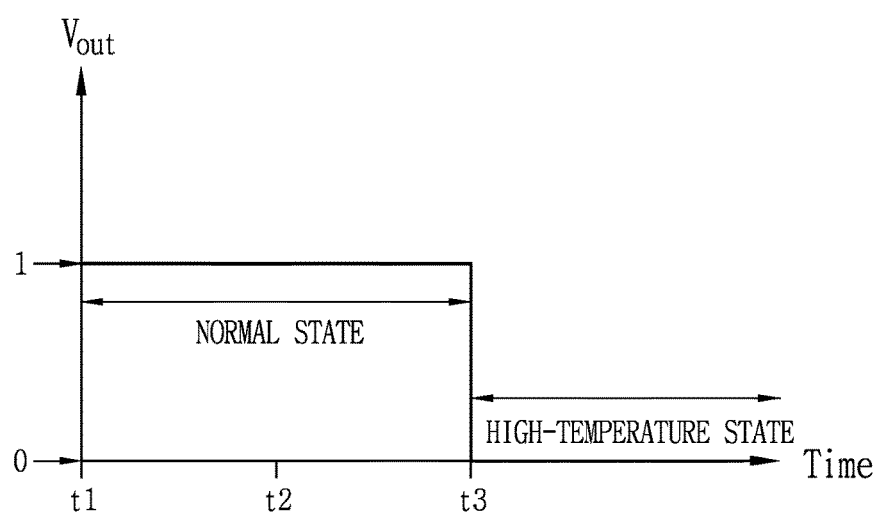

FIGS. 4A and 4B are signal waveform diagrams for helping understand an operation of the temperature detection and protection unit 300 of FIG. 3 to control switching of the magnetic contactor according to the present invention.

Here, Vin indicates the magnitude of a plurality of input voltages input to the first comparator 321 shown in FIG. 3.

That is, the first voltage V1 is a reference voltage, which indicates a reference voltage Vref that is input to the positive (+) input terminal of the first comparator 321.

Also, the second voltage V2 indicates a voltage according to an output signal from the temperature detection unit 310 that is input to the negative (−) input terminal of the first comparator 321.

The first voltage V1 is a divided voltage obtained by dividing the DC constant voltage with the resistors R2 and R3 and maintains a constant potential independently of time elapsed.

The second voltage V2 increases linearly from second time point t2 as the temperature inside the magnetic contactor increases, and then has the same potential as the first voltage V1 at third time point t3.

FIG. 4A shows that the second voltage, which is formed by the combined resistance of the variable resistor 311 and the thermal variable resistor 312, increases linearly from second time point t2 as a resistance value of the thermal variable resistor 312 increases linearly from second time point t2 due to a change in temperature inside the magnetic contactor.

FIG. 4B shows that the first comparator 321 outputs a high-level output signal, that is, a digital output signal having a logical value 1 from first time point t1 to third time point t3 (while the temperature inside the magnetic contactor is in a normal state) and outputs a low-level output signal, that is, a digital output signal having a logical value 0 after third time point t3 (when the temperature inside the magnetic contactor is in a high-temperature state).

In FIG. 4B, Vout indicates the magnitude of voltage according to an output signal output by the first comparator 321.

This will be described in detail below with reference to FIG. 3.

When the second voltage V2 input to a negative input terminal {(−) input terminal} and formed in the temperature detection unit 310 is lower than the first voltage V1 input to a positive input terminal {(+) input terminal} of the first comparator 321 since the temperature inside the magnetic contactor is in a normal state, the first comparator 321 outputs a high-level signal, that is, a digital signal having a logical value 1.

On the other hand, when the second voltage V2 input to the negative input terminal {(−) input terminal} is higher than the second voltage V2 input to the positive input terminal ((+) input terminal) 321 since the temperature inside the magnetic contactor is in the high-temperature state, the first comparator 321 outputs a low-level signal, that is, a digital signal having a logical value 0.

In FIG. 4A, a gradient of change in the second voltage V2 formed in the temperature detection unit 310 may vary depending on selection of the thermal variable resistor 312 or resistance of the variable resistor 311 set by the user.

Also, in FIG. 4A, the magnitude of the first voltage V1 as the reference voltage can be determined by a combination of voltage dividing resistors R2 and R3.

An operation of a magnetic coil driving circuit of a magnetic contactor according to an embodiment of the present invention will be described with reference to FIG. 5, which shows the operation using main circuit elements, signal waveforms, and a table.

A pulse width modulation unit 510, a first comparator 520, a second comparator 530, a semiconductor switch 540, and a magnetic coil 550 shown in FIG. 5 have the same or similar configurations and functions as above described with reference to FIG. 3.

Figure 5:
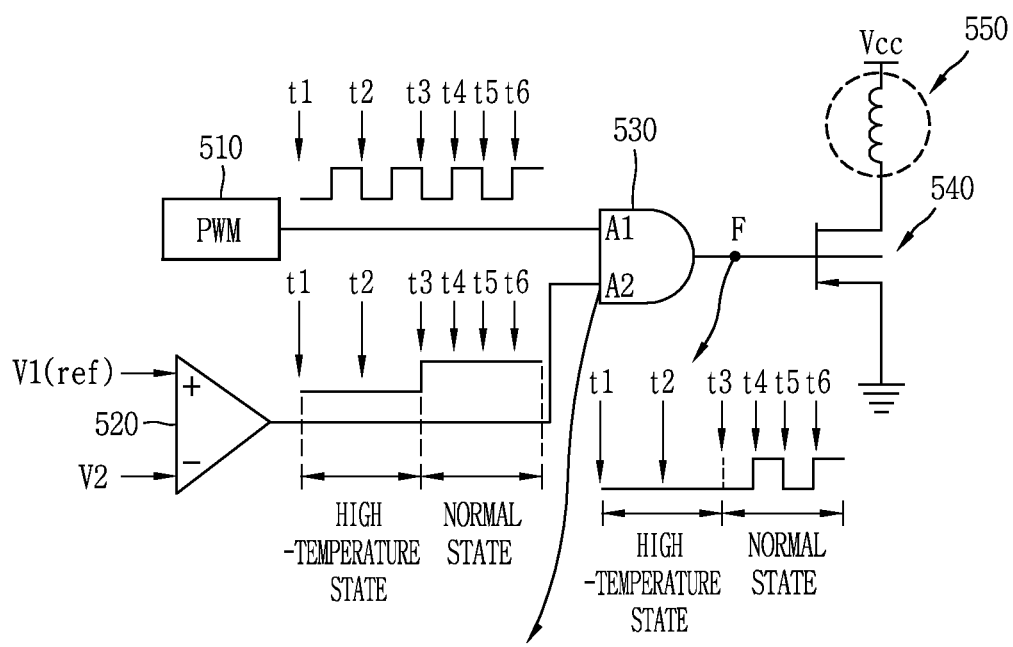
FIG. 5 is a diagram showing, through main circuit blocks, signal waveforms, and a table, an entire operation of a magnetic coil driving circuit according to an embodiment of the present invention.

According to an embodiment shown in FIG. 5, the second comparator 530 is configured with an AND gate.

In FIG. 5, at a plurality of time points t1 to t6, the pulse width modulation unit 510 outputs a pulse signal, that is, a switching control signal configured with a high-level signal and a low-level signal according to a control signal received from a control unit.

The first comparator 520 compares a first voltage V1 which is a reference voltage and a second voltage V2 which is a voltage corresponding to temperature detection input respectively through both input terminals, and then outputs a high-level output signal (in case where the temperature inside the magnetic contactor is in a normal state) or a low-level output signal (in case where the temperature inside the magnetic contactor is in a high-temperature state) as a result of the comparison.

As an embodiment of the present invention, the second comparator 530 is configured with an AND gate and configured to receive output signals from both of the pulse width modulation unit 510 and the first comparator 520 and output a final switching control signal for controlling an operation of turning on or off the semiconductor switch 540.

That is, the output signal of the pulse width modulation unit 510 is received at a first input terminal A1 of the second comparator 530, and the output signal of the first comparator 520 is received at a second input terminal A2.

A signal processing operation of the second comparator 530 at the plurality of time points t1 to t6 will be described as follows.

Here, during a first section, that is, a first time period (t1 to t3), the temperature detection and protection unit (see a part represented by reference number 300 of FIG. 3) of the magnetic contactor according to the present invention detects a high-temperature state. Here, the high-temperature may refer to a state in which the temperature inside the magnetic contactor exceeds an allowable value. Also, the allowable value of the temperature may refer to a maximum threshold temperature to which various electrical components, such as a magnetic coil, a capacitor, and a semiconductor switch, configuring the magnetic coil driving circuit are not deteriorated or damaged.

As described above, when the temperature detection and protection unit (see reference number 300 of FIG. 3) of the magnetic contactor detects a high-temperature state, the second comparator 530 outputs a low-level output signal to the semiconductor switch 540 independently of the output signal received from the pulse width modulation unit 510 and turns off the semiconductor switch 540. Accordingly, the magnetic coil 550 is demagnetized, and the magnetic contactor is turned to an open state. Electric power supplied from a power supplying source to a load through the magnetic contactor is broken.

On the other hand, during a second section, that is, a second time period (t4 to t6), the temperature detection and protection unit 300 of the magnetic contactor according to the present invention detects a normal state. Here, the normal state may refer to a state in which the temperature inside the magnetic contactor is within a predetermined allowable range.

In this case, the second comparator 530 outputs an output signal of a high-level or low-level pulse signal to the semiconductor switch 540 as the final switching control signal corresponding to the control signal received from the pulse width modulation unit 510, and controls a switching operation of the semiconductor switch 540 with a pulse width according to the corresponding output signal.

That is, when the detected temperature is within the predetermined allowable range, the output signal of the first comparator 520 has a high-level value, that is, a logical value 1, as shown in FIG. 5. Thus, the semiconductor switch 540 is turned on or off depending on the control signal of the pulse width modulation unit 510. In order words, the semiconductor switch 540 is turned on when a pulse signal as the control signal from the pulse width modulation unit 510 is in high level, and is turned off when the pulse signal as the control signal from the pulse width modulation unit 510 is in low level.

As described above, whether to open or close a magnetic contactor may be determined based on a temperature inside the magnetic contactor by a combination of the pulse width modulation unit 510, the first comparator 520, and the second comparator 530. Thus, it is possible to prevent damage of the magnetic contactor.

According to an exemplary aspect of the present invention, when the detected temperature inside the magnetic contactor is within the predetermined allowable range, that is, in a normal state, the magnetic coil driving circuit of the magnetic contactor according to the present invention turns on or off the semiconductor switch 540 according to a pulse width and a level of the output signal of the pulse width modulation unit 510.

According to one preferred aspect of the present invention, when the detected temperature inside the magnetic contactor exceeds the predetermined allowable range, that is, is in a high-temperature state, the magnetic coil driving circuit of the magnetic contactor according to the present invention turns off the semiconductor switch 540 to demagnetize the magnetic coil 550 independently of the output signal of the pulse width modulation unit 510. Accordingly, the magnetic contactor operates to turn off (circuit opening state).

Therefore, the magnetic coil driving circuit of the magnetic contactor according to the present invention can monitor a change in temperature inside the magnetic contactor that is caused by various reasons and turn the magnetic contactor to the circuit opening state (the turn-off state) when the temperature inside the magnetic contactor increases and exceeds an allowable range, thus preventing the magnetic contactor and a load connected with the magnetic contactor from being damaged.

It will be understood by those skilled in the art that the elements and/or functions described in various embodiments may be implemented in combination, and various modifications and changes may be made herein without departing from the spirit and scope of the appended claims.

What is claimed is:

1. A magnetic coil driving circuit for magnetic contactor, the magnetic coil driving circuit comprising:
   a semiconductor switch connected in series to a magnetic coil and configured to magnetize the magnetic coil upon turning on and demagnetize the magnetic coil upon turning off;
   a pulse width modulation unit connected to the semiconductor switch and configured to output a pulse signal to the semiconductor switch as a control signal for turning on or off the semiconductor switch;
   a control unit connected to the pulse width modulation unit and configured to output a control signal for changing a pulse width of the pulse signal in order to perform control to increase the amount of electric current flowing through the magnetic coil when the magnetic coil is initially magnetized and perform control to decrease the amount of electric current flowing through the magnetic coil when the magnetization of the magnetic coil is maintained; and a temperature detection and protection unit connected to the semiconductor switch and configured to detect a temperature inside the magnetic contactor, output an output signal for turning off the semiconductor switch in a high-temperature state when the temperature exceeds an allowable temperature, and to make the semiconductor switch be controlled by the pulse signal from the pulse width modulation unit in a normal state when the temperature is within the allowable temperature.

2. The magnetic coil driving circuit of claim 1, wherein the temperature detection and protection unit comprises at least one thermal variable resistor having a resistance value that varies with a change in temperature.

3. The magnetic coil driving circuit of claim 1, wherein the temperature detection and protection unit comprises:
at least one thermal variable resistor having a resistance value that varies with a change in temperature; and
at least one variable resistor connected in parallel with the thermal variable resistor.

4. The magnetic coil driving circuit of claim 1, wherein the temperature detection and protection unit comprises:
a temperature detection unit configured to output a first voltage that varies with a change in temperature inside the magnetic contactor; and
a comparator configured to compare the first voltage which is output from the temperature detection unit and a second voltage which is a predetermined reference voltage.

5. The magnetic coil driving circuit of claim 1, wherein the temperature detection and protection unit comprises:
a temperature detection unit configured to output a first voltage that varies with a change in temperature inside the magnetic contactor;
a first comparator configured to compare the first voltage, which is output from the temperature detection unit, and a second voltage, which is a predetermined reference voltage; and
a second comparator having a first input terminal connected to an output terminal of the first comparator and a second input terminal connected to an output terminal of the pulse width modulation unit, the second comparator being configured to compare an input signal from the first input terminal and an input signal from the second input terminal and output a switching control signal for controlling a switching of the semiconductor switch.

6. The magnetic coil driving circuit of claim 4, wherein, when the temperature inside the magnetic contactor exceeds the allowable temperature and a temperature state is in a high-temperature state, the comparator is configured to output a digital signal having a logical value 0.

7. The magnetic coil driving circuit of claim 5, wherein:
the second comparator is configured with an AND gate; and
when the temperature inside the magnetic contactor exceeds the allowable temperature and a temperature state is in a high-temperature state, the first comparator is configured to output a digital signal having a logical value 0.

8. The magnetic coil driving circuit of claim 5, wherein:
the second comparator is configured with an AND gate;
when the temperature inside the magnetic contactor is within the allowable temperature and a temperature state is in a normal state, the first comparator is configured to output a digital signal having a logical value 1; and
the semiconductor switch is turned on or off depending on the pulse signal from the pulse width modulation unit.

9. The magnetic coil driving circuit of claim 5, wherein:
the second comparator is configured with an AND gate;
when the temperature inside the magnetic contactor exceeds the allowable temperature and a temperature state is in a high-temperature state, the first comparator is configured to output a digital signal having a logical value 0; and
the semiconductor switch is turned off independently of the pulse signal from the pulse width modulation unit.

10. The magnetic coil driving circuit of claim 1, further comprising a voltage detection unit configured to detect a voltage of an AC power source supplied to the magnetic contactor,
wherein the control unit is configured to compare the voltage of the AC power source detected by the voltage detection unit with a reference voltage and output a control signal for opening the magnetic contactor to the pulse width modulation unit when the voltage of the AC power source exceeds the reference voltage.

* * * * *